United States Patent [19]

Sens et al.

[11] Patent Number: 5,218,120
[45] Date of Patent: Jun. 8, 1993

[54] QUINOLINEMETHINE DYES

[75] Inventors: Ruediger Sens, Mannheim; Karl-Heinz Etzbach, Frankenthal, both of Fed. Rep. of Germany

[73] Assignee: BASF Aktiengesellschaft, Ludwigshafen, Fed. Rep. of Germany

[21] Appl. No.: 760,331

[22] Filed: Sep. 16, 1991

[30] Foreign Application Priority Data

Oct. 4, 1990 [DE] Fed. Rep. of Germany ....... 4031254

[51] Int. Cl.$^5$ ............................................. C07D 101/02
[52] U.S. Cl. ................................. 546/166; 544/105; 544/128; 546/167; 546/171
[58] Field of Search ..................... 546/167, 171, 166

[56]    References Cited
U.S. PATENT DOCUMENTS

| | | | |
|---|---|---|---|
| 4,695,287 | 9/1987 | Evans et al. | 8/471 |
| 4,769,360 | 9/1988 | Evans et al. | 503/227 |
| 4,908,437 | 3/1990 | Hansen et al. | 534/738 |

FOREIGN PATENT DOCUMENTS

| | | |
|---|---|---|
| 0416434 | 3/1991 | European Pat. Off. . |
| 3716656 | 12/1988 | Fed. Rep. of Germany . |
| 61-19396 | 1/1986 | Japan . |
| 2-241786 | 9/1990 | Japan . |

OTHER PUBLICATIONS

Murata et al., Chemical Abstracts, vol. 114(1990) 145642t.
Murata et al., Chemical Abstracts, vol. 114(1990) 145395q.
Kubo et al., Chemical Abstracts, vol. 113(1990) 25541s.
Journal of the Chemical Society, Perkin Transactions 1., vol. 2, No. 8, pp. 1469-1472, Y. Kubo, et al., "Synthesis of Novel Near-Infrared Absorbing Metal Complex Dyes With Indoaniline-Type Ligands", 1989.
Patent Abstracts of Japan, vol. 14, No. 265 (C-726)(4208), Jun. 8, 1990, & JP-A-2-076-884, Mar. 16, 1990, Y. Kubo, et al., "Metal-Contailing Pyridophenothiazone Compound".
Patent Abstracts of Japan, vol. 14, No. 555 (c-786)(4498), Dec. 10, 1990, & JP-A-2-238-059, Sep. 20, 1990, Y. Kubo, et al., "Stable Type Indoaniline-Based Leuco Coloring Matter".
Journal of the Chemical Society, Chemical Communications, vol. 2, No. 18, pp. 1253-1254, Sep. 15, 1990, Y. Kubo, et al., "New Indoaniline-Type Near Infrared Colour Former".
Journal of the Chemical Society, Chemical Communications, No. 22, pp. 1457-1458, Y. Kubo, et al., "New Bis[3-(4'-Dialkylaminophenyl)Pyrido[2,3-a]Phenothiazine]Nickel(II) Complexes with Near-Infrared Absorptions", 1988.
Derwent Japanese Patents, No. 90-372944, & JP-A-2-270592, Nov. 5, 1990, "Heat-Sensitive Transfer Sheet Giving High Colour Density Recordings At High Speed, Has Colouring Layer Contg. Indoaniline Dye".
Derwent Japanese Patents, No. 89-182948, & JP-A-1-121-851, May 15, 1989, "Silver Halide Photographic Material—Contg. Hydrophilic Colloid Layer Comprising Water Soluble Dye".
Derwent Japanese Patents, No. 90-337851, & JP-A-2-241-786, Sep. 26, 1990, "Transfer Printing Method—Includes Putting Transfer Sheet Patterned With Ink Contg. Specific Sublimable Dyes With Acceptance Resin, Heating Etc.".
Patent Abstracts of Japan, vol. 10, No. 167 (M-488)(2223), Jun. 13, 1986, & JP-A-61-019-396, Jan. 28, 1986, T. Niwa, et al., "Coloring Matter For Thermal Transfer Recording".
Japan Abstract, 234987, JP-A-084-388, Mar. 26, 1990.

Primary Examiner—Richard L. Raymond
Attorney, Agent, or Firm—Oblon, Spivak, McClelland, Maier & Neustadt

[57]    ABSTRACT

Quinolinemethine dyes suitable for use in a thermal transfer process have the formula

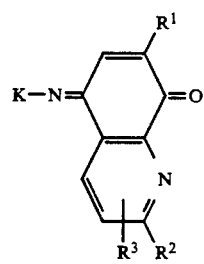

where
$R^1$ is fluorine, chlorine or bromine,
$R^2$ is hydrogen or $C_1$-$C_4$-alkyl,
$R^3$ is hydrogen, fluorine, chlorine or bromine, and
K is the radical of an aniline derivative.

2 Claims, No Drawings

QUINOLINEMETHINE DYES

The present invention relates to novel quinolinemethine dyes of the formula I (I)

[Structure: quinolinemethine dye with substituents K—N, R¹, =O, R², R³]

where
R¹ is fluorine, chlorine or bromine,
R² is hydrogen or $C_1$-$C_4$-alkyl,
R³ is hydrogen, fluorine, chlorine or bromine, and
K is a radical of the formula (IIa)
[Structure with R⁵, R⁶, R⁷, R⁴ substituents on aniline]

(IIb)
[Indoline structure with $H_3C$, $H_3C$, $H_3C$, N-R⁶, R⁴]

(IIc)
[Tetrahydroquinoline structure with CH₃, $H_3C$, $H_3C$, N-R⁶, R⁴]

(IId)
[Benzoxazine structure with O, N-R⁶, R⁴]

(IIe)
[Pyrrolidinyl-aryl structure with H N, R⁴]

(IIf)
[Piperidinyl-aryl structure with R⁴]

or (IIg)
[Morpholinyl-aryl structure with O, N, R⁴]

where
R⁴ is hydrogen, methyl, methoxy, $C_1$-$C_4$-alkyl-sulfonylamino, $C_1$-$C_4$-mono- or -dialkylamino-sulfonylamino or the radical -NHCOR⁸ or -NHCO₂R⁸, where r⁸ is phenyl, benzyl, tolyl or $C_1$-$C_8$-alkyl which may be interrupted by one or two oxygen atoms in ether function,
R⁵ is hydrogen, methoxy or ethoxy, and
R⁶ and R⁷ are identical or different and each is independently of the other hydrogen, $C_1$-$C_8$-alkyl which may be substituted and which may be interrupted by one or two oxygen atoms in ether function, or $C_5$-$C_7$-cycloalkyl,
and to a process for the thermal transfer thereof.

JP-A-19 396/1986 discloses quinolinemethine dyes in which ring position 7 of the quinoline ring is unsubstituted.

Furthermore, JP-A-84 388/1990 and U.S. Pat. No. 4,769,360 describe naphthoquinoneimine dyes which have a chlorine or iodine atom in the ortho-position relative to the carbonyl group.

However, it has been found that the prior art dyes still have deficiencies in their application properties.

It is an object of the present invention to provide novel quinolinemethine dyes which are advantageously suitable for thermal transfer.

We have found that this object is achieved by the quinolinemethine dyes of the formula I defined at the beginning.

Any alkyl appearing in the abovementioned formula I may be straight-chain or branched.

Substituted alkyl appearing in the abovementioned formula I may possess as substituents for example cyano, phenyl, tolyl, $C_1$-$C_6$-alkanoyloxy, $C_1$-$C_4$-alkoxycarbonyl or $C_1$-$C_4$-alkoxycarbonyloxy, of which in the last-mentioned case the alkoxy group may be substituted by phenyl or $C_1$-$C_4$-alkoxy.

Suitable R², R⁶, R⁷ and R⁸ radicals are for example methyl, ethyl, propyl, isopropyl, butyl, isobutyl and sec-butyl.

R⁶, R⁷ and R⁸ may each also be for example pentyl, isopentyl, neopentyl, tert-pentyl, hexyl,-2-methylpentyl, heptyl, octyl, 2-ethylhexyl, 2-methoxyethyl, 2- or 3-methoxypropyl, 2-ethoxyethyl, 2- or 3-ethoxypropyl, 2-propoxyethyl, 2- or 3-propoxypropyl, 2-butoxyethyl, 2-or 3-butoxypropyl, 3,6-dioxaheptyl or 3,6-dioxaoctyl.

R⁶ and R⁷ may each also be for example -cyanoethyl, 2- or 3-cyanopropyl, 2-acetyloxyethyl, 2-or 3-acetyloxypropyl, 2-isobutyryloxyethyl, 2-or 3-isobutyryloxypropyl, 2-methoxycarbonylethyl, 2- or 3-methoxycarbonylpropyl, 2-ethoxycarbonylethyl, 2- or 3-ethoxycarbonylpropyl 2-methoxycarbonyloxyethyl, 2- or 3-methoxycarbonyloxypropyl, 2-ethoxycarbonyloxyethyl, 2-or 3-ethoxycarbonyloxypropyl, 2-propoxycarbonyloxyethyl, 2- or 3-propoxylcarbonyloxypropyl, 2-butoxycarbonyl-oxyethyl, 2- or 3-butoxycarbonyloxypropyl, 2-(2-phenylethoxycarbonyloxy)ethyl, 2- or 3-(2-phenylethoxycarbonyloxy) propyl, 2 - ( 2 -ethoxyethoxycarbonyloxy) ethyl , 2 - or 3-(2-ethoxyetho xycarbonyloxy)propyl, benzyl, 2-methylbenzyl, 1- or 2-phenylethyl, cyclopentyl, cyclohexyl of cycloheptyl.

$R^4$ is for example methylsulfonylamino, ethylsulfonylamino, propylsulfonylamino, isopropylsulfonylamino, butylsulfonylamino, mono- or dimethylaminosulfonylamino, mono- or diethylaminosulfonylamino, mono-or dipropylaminosulfonylamino, mono- or diisopropylamino-sulfonylamino, mono- or dibutylaminosulfonylamino or (N-methyl-N-ethylaminosulfonyl)amino.

Preference is given to quinolinemethine dyes of the formula I where
$R^1$ is chlorine,
$R^2$ is hydrogen or methyl,
$R^3$ is hydrogen, and
K is a radical of the formula IIa, IIc, IIe, IIf or IIg.

Emphasis must be given to quinolinemethine dyes of the formula I where $R^4$ is the radical -NHCOR$^8$ or —NHCC$_2$R$^8$, where R$^8$ is in either case as defined above.

Particular preference is given to quinoline-methine dyes of the formula I where
$R^1$ is chlorine,
$R^2$ is hydrogen or methyl,
$R^3$ is hydrogen, and
K is a radical of the formula IIa or IIc where
$R^4$ is hydrogen, methyl or acetylamino,
$R^5$ is hydrogen or methoxy, and
$R^5$ and $R^7$ are each independently of the other hydrogen, benzyl or substituted or unsubstituted $C_1$-$C_8$-alkyl.

The quinolinemethine dyes of the formula I according to the present invention are preparable by methods known per se.

For example, a nitroso compound of the formula III

$$K-N=O \qquad (III)$$

where K is as defined above, can be condensed with a quinoline of the formula IV

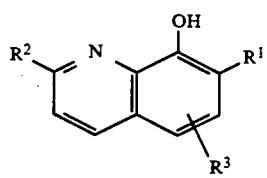

(IV)

where $R^1$, $R^2$ and $R^3$ are each as defined above (see for example DE-A-3 716 656).

It is also possible to couple amines of the formula V

$$K-NH_2 \qquad (V)$$

where K is as defined above, oxidatively with the quinolines of the formula IV (see for example U.S. Pat. No. 4,695,287).

It is a further object of the present invention to provide a novel process for the thermal transfer of dyes.

In the thermotransfer printing process, a transfer sheet which contains a thermally transferable dye in one or more binders on a substrate, with or without suitable assistants, is heated from the back with an energy source, for example a thermal printing head, in short pulses (lasting fractions of a second), causing the dye to migrate out of the transfer sheet and diffuse into the surface coating of a receiving medium. The essential advantage of this process is that the amount of dye to be transferred (and hence the color gradation) is readily controllable through adjustment of the energy to be emitted by the energy source.

In general, color recording is carried out using the three subtractive primaries yellow, magenta and cyan (with or without black).

To ensure optimal color recording, the dyes must have the following properties:
ready thermal transferability,
little tendency to migrate within or out of the surface coating of the receiving medium at room temperature,
high thermal and photochemical stability and resistance to moisture and chemical substances,
suitable hues for subtractive color mixing,
a high molar absorption coefficient,
no tendency to crystallize out on storage of the transfer sheet.

These requirements are very difficult to meet at one and the same time.

For this reason most of the existing thermal transfer dyes do not have the required combination of properties.

We have found that the object of a novel process for the thermal transfer of dyes is achieved by a process for transferring quinolinemethine dyes from a transfer to a sheet of plastic-coated paper by diffusion or sublimation with the aid of an energy source, which comprises using a transfer with one or more quinolinemethine dyes of the formula I above.

Compared with the dyes used in existing processes, the dyes of the formula I to be transferred in the process of the present invention generally possess improved migration properties in the receiving medium at room temperature, readier thermal transferability, higher thermal and photochemical stability, readier industrial accessibility, better resistance to moisture and chemical substances, higher color strength, better solubility or better suitability for subtractive color mixing (higher purity of hue, more favorable shape of absorption bands). They are also particularly advantageously suitable for dye mixtures with triazolopyridine dyes as described in earlier patent application EP-A-416 434. This is true chiefly in respect of better transferability, higher inked ribbon stability, higher light fastness, better distribution of the transfer dyes in the receiving medium and in particular the preparation of better black mixtures.

To prepare the dye transfers required for the process of the present invention, the dyes are incorporated into a suitable organic solvent or into mixtures of solvents together with one or more binders and possibly assistants to form a printing ink in which the dye is preferably present in a molecularly dispersed, ie. dissolved, form. The printing ink can be applied to the inert substrate by knife coating and air dried.

Suitable organic solvents for the dyes I are for example those in which the solubility of the dyes I is greater than 1% by weight, preferably greater than 5% by weight, at 20° C.

Examples which may be mentioned are ethanol, propanol, isobutanol, tetrahydrofuran, methylene chloride, methyl ethyl ketone, cyclopentanone, cyclohexanone, toluene, chlorobenzene and mixtures thereof.

Suitable binders are all resins or polymer materials which are soluble in organic solvents and capable of binding the dye to the inert substrate in a form in which it will not rub off. Preference is given here to those binders which, after the printing ink has been air dried, hold the dye in a clear, transparent film in which no visible crystallization of the dye occurs.

Examples of such binders are cellulose derivatives, eg. methylcellulose, ethylcellulose, ethyl-hydroxyethylcellulose, hydroxypropylcellulose, cellulose acetate or cellulose acetobutyrate, starch, alginates, alkyd resins, vinyl resins, polyvinyl alcohol, polyvinyl acetate, polyvinyl butyrate and polyvinylpyrrolidones. It is also possible to use polymers and copolymers of acrylates or their derivatives, such as polyacrylic acid, polymethyl methacrylate or styrene-acrylate copolymers, polyester resins, polyamide resins, polyurethane resins or natural CH resins such as gum arabic. Further suitable binders are described for example in DE-A-3 524 519.

Preferred binders are ethylcellulose, ethyl-hydroxyethylcellulose, polyvinyl butyrate and polyvinyl acetate.

The ratio of binder to dye may vary, preferably from 1 : 1 to 10 : 1.

Possible assistants are release agents as mentioned in EP-A-227 092, EP-A-192 435 and the patent applications cited therein, but also in particular organic additives which prevent the transfer dyes from crystallizing out in the course of storage and heating of the inked ribbon, for example cholesterol or vanillin.

Inert substrate materials are for example tissue, blotting or parchment paper and plastics films possessing good heat resistance, for example metallized or unmetallized polyester, polyamide or polyimide. The inert substrate may additionally be coated on the side facing the thermal printing head with a lubricant or slipping layer in order that adhesion of the energy source, in particular the thermal printing head, to the substrate material may be prevented. Suitable lubricants are described for example in EP-A-216 483 and EP-A-227 095. The thickness of the substrate is in general from 3 to 30 μm, preferably from 5 to 10 μm.

The dye-receiving layer can be basically any heat resistant plastics layer which possesses affinity for the dyes to be transferred, for example a modified polycarbonate or polyester. Suitable recipes for the receiving layer composition are described in detail for example in EP-A-227 094, EP-A-133 012, EP-A-133 011, EP-A-111 004, JP-A-199 997/1986, JP-A-283 595/1986, JP-A-237 694/1986 and JP-A-127 392/1986.

The transfer process is effected by means of an energy source, for example a laser or a thermal printing head, which in the latter case must be heatable to ≧300° C. in order that the transfer of the dye may take place within the time range t: $0 < t < 15$ msec. In the course of transfer, the dye migrates out of the transfer sheet and diffuses into the surface coating of the receiving medium.

The dyes of the present invention are also advantageously suitable for dyeing synthetic materials, for example polyesters, polyamides or polycarbonates, and in particular textile fabrics of polyester, polyamide or polyester-cotton blend fabrics.

The novel dyes are also advantageously suitable for the production of color filters as described for example in EP-A-399 473.

They can also be used with advantage in the production of toners for use in electrophotography.

Further details concerning the preparation may be discerned from the Examples which follow, in which the percentages are by weight, unless otherwise stated.

Preparation of dyes

EXAMPLE 1

10 g of N,N-diethyl-p-phenylenediamine hydrochloride and 11.4 g of 5,7-dichloro-8-hydroxy-2-methylquinoline were introduced into 300 ml of ethanol. Then a solution of 8.5 g of silver nitrate in 38 ml of water was added dropwise at room temperature with stirring. On completion of the addition 38 ml of 25% strength by weight of ammonium hydroxide solution and then a solution of 21.3 g of silver nitrate in 25 ml of water were added to the reaction solution. After stirring at 30°-40° C. for 3 hours the reaction solution was filtered with suction, and the filter residue was dried at room temperature under reduced pressure in a drying cupboard and then chromatographed over a column (silica gel/ethyl acetate). The yield of spectrally ultrapure dye of the formula

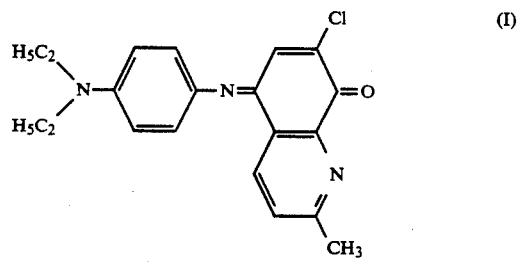

was 8 6 g. The dye had a melting point of 145° C. and an absorption maximum (measured in tetrahydrofuran) of 616 nm.

The same method was used to obtain the dyes described in more detail in the following Table 1 and in the subsequent transfer experiments:

TABLE 1

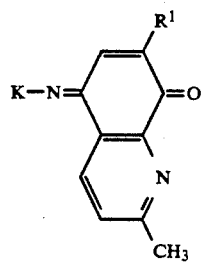

| Example No. | K | $R^1$ | $R^6$ | $R^7$ | $R^5$ | $R^4$ | $\lambda_{max}$ [nm][a] | Rf value |
|---|---|---|---|---|---|---|---|---|
| 2 | II$_c$ | Cl | CH$_3$ | — | — | CH$_3$ | 648 | 0.45[b] |
| 3 | II$_c$ | Br | CH$_3$ | — | — | CH$_3$ | 650 | 0.47[b] |

TABLE 1-continued

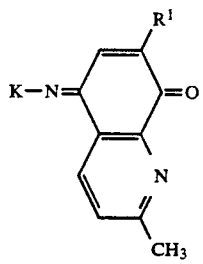

| Example No. | K | R¹ | R⁶ | R⁷ | R⁵ | R⁴ | $\lambda_{max}$ [nm][a] | Rf value |
|---|---|---|---|---|---|---|---|---|
| 4 | II$_c$ | Cl | C$_2$H$_5$ | — | — | H | 634 | 0.40[b] |
| 5 | II$_c$ | Br | C$_2$H$_5$ | — | — | H | 637 | 0.33[b] |
| 6 | II$_c$ | Cl | C$_2$H$_4$CO$_2$C$_2$H$_5$ | — | — | H | 620 | 0.30[b] |
| 7 | II$_c$ | Br | C$_2$H$_4$CO$_2$C$_2$H$_5$ | — | — | H | 622 | 0.34[b] |
| 8 | II$_a$ | Cl | C$_2$H$_5$ | C$_2$H$_5$ | H | NHCO$_2$CH$_3$ | 643 | 0.38[c] |
| 9 | II$_a$ | Br | C$_2$H$_5$ | C$_2$H$_5$ | H | NHCO$_2$CH$_3$ | 647 | 0.35[b] |
| 10 | II$_a$ | Cl | C$_2$H$_5$ | CH(CH$_3$)$_2$ | H | H | 633 | 0.35[b] |
| 11 | II$_a$ | Br | C$_2$H$_5$ | CH(CH$_3$)$_2$ | H | H | 636 | 0.38[b] |
| 12 | II$_a$ | Cl | C$_2$H$_5$ | C$_2$H$_4$OCH$_3$ | H | CH$_3$ | 628 | 0.27[b] |
| 13 | II$_a$ | Br | C$_2$H$_5$ | C$_2$H$_4$OCH$_3$ | H | CH$_3$ | 631 | 0.27[b] |

[a] measured in tetrahydrofuran
[b] mobile phase 3:2 v/v toluene/ethyl acetate
[c] mobile phase ethyl acetate Transfer of dyes For a simple quantitative examination of the transfer characteristics of the dyes, the thermal transfer was effected with large hotplates, the transfer temperature being varied within the range 70° C. $<T<120°$ C. while the transfer time was fixed at 2 minutes.

α) General recipe for coating the substrate with dye: 1 g of binder was dissolved in 8 ml of 8:2 v/v toluene/ethanol at 40°-50° C. A solution of 0.25 g of dye in 5 ml of tetrahydrofuran was added with stirring and, if necessary, insoluble residue was filtered off. The print paste thus obtained was applied with an 80 μm doctor blade to a polyester sheet (thickness: 6-10 μm) and dried with a hair dryer.

β) Testing of thermal transferability The dyes used were tested as follows: The polyester sheet donor containing the in-test dye in the coated front was placed face down on a sheet of commercially available paper receptor (further details below) and pressed down. Donor/receptor were then wrapped in aluminum foil and heated between two hotplates at various temperatures T (within the temperature range 70° C. $<T<120°$ C.). The amount of dye diffusing into the bright plastics layer of the receptor is proportional to the optical density (=absorbance A). The latter was determined photo-metrically. The plots of the logarithm of the absorbance A of the colored receptor papers measured within the temperature range from 80° to 110° C against the reciprocal of the corresponding absolute temperature are straight lines from whose slope it is possible to calculate the activation energy $\Delta E_t$ for the transfer experiment:

$$\Delta E_T = 2.3 \times R \times \frac{\Delta \log A}{\Delta \left[\frac{1}{T}\right]}$$

To complete the characterization, the plots additionally reveal the temperature T*[° C.]at which the absorbance A of the colored receptor papers attains the value 1:

The dyes listed below in Table 2 were processed according to α) and the dye-coated transfers obtained were tested for their transfer characteristics according to β). The table shows in each case the thermotransfer parameters T* and $\Delta E_T$, the absorption maxima $\lambda_{max}$ (measured in tetrahydrofuran) and the binders used.

The key to the abbreviations is as follows:
B binder
EC ethylcellulose
MX mixture of polyvinyl butyrate and ethylcellulose in a weight ratio of 2:1
V = Vylon ®290 (from Toyobo)

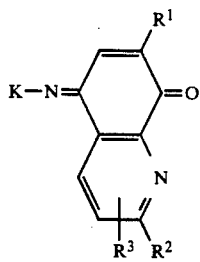

| Example No. | K | $R^1$ | $R^2$ | $R^6$ | $R^7$ | $R^5$ | $R^4$ | $R^3$ | B | $\lambda_{max}$ [nm] | T*[°C.] | $\Delta E_T$ [kcal/mol] |
|---|---|---|---|---|---|---|---|---|---|---|---|---|
| 14*) | IIa | Cl | $CH_3$ | $C_2H_5$ | $C_2H_5$ | H | H | H | V | 616 | 92 | 16 |
| 15 | IIa | Cl | $CH_3$ | $C_2H_5$ | $C_2H_5$ | H | $NHCOCH_3$ | H | MX | 649 | 95 | 13 |
| 16 | IIa | Cl | $CH_3$ | $C_2H_5$ | $C_2H_5$ | H | $NHCO_2C_2H_4OC_2H_5$ | H | EC | 651 | 98 | 12 |
| 17 | IIc | Cl | $CH_3$ | $C_2H_5$ | — | — | $CH_3$ | H | V | 651 | 101 | 16 |
| 18 | IIa | Cl | $CH_3$ | $C_4H_9$ | $C_2H_5$ | H | H | H | V | 617 | 94 | 14 |
| 19 | IIa | Cl | $CH_3$ | $C_4H_9$ | $C_2H_5$ | H | $CH_3$ | H | V | 635 | 95 | 15 |
| 20 | IIa | Cl | $CH_3$ | $C_4H_9$ | $CH_2$—$CH(CH_3)_2$ | — | $CH_3$ | H | EC | 618 | 96 | 17 |
| 21 | IIc | Cl | $CH_3$ | $C_2H_5$ | — | — | H | H | EC | 635 | 100 | 13 |
| 22 | IIa | Br | $CH_3$ | $C_2H_5$ | $C_2H_5$ | H | H | H | EC | 617 | 100 | 17 |
| 23 | IIa | Cl | $CH_3$ | $C_4H_9$ | $C_4H_9$ | H | H | H | EC | 619 | 103 | 12 |
| 24 | IIa | Cl | $CH_3$ | $C_2H_5$ | $C_2H_5$ | H | $CH_3$ | H | EC | 633 | 89 | 14 |
| 25 | IIa | Cl | $CH_3$ | $C_4H_9$ | $C_4H_9$ | H | $CH_3$ | H | EC | 636 | 118 | 13 |
| 26 | IIc | Cl | $CH_3$ | $C_2H_4OC_4H_9$ | — | — | $CH_3$ | H | V | 646 | 110 | 12 |
| 27 | IIa | Cl | $CH_3$ | H | $CH(CH_3)_2$ | $OCH_3$ | H | H | EC | 623 | 99 | 15 |
| 28 | IIa | Cl | $CH_3$ | $C_2H_5$ | $C_2H_5$ | H | H | Cl | EC | 647 | 97 | 15 |
| 29 | IIa | Cl | $CH(CH_3)_2$ | $C_4H_9$ | $C_4H_9$ | H | $CH_3$ | H | V | 636 | 98 | 16 |

*)The dye of example 14 is the product described in Example 1

We claim:
1. A quinolinemethine dye of the formula I

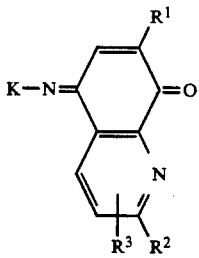

(I)

where
$R^1$ is fluorine, chlorine or bromine,
$R^2$ is hydrogen or $C_1$-$C_4$-alkyl,
$R^3$ is hydrogen, fluorine, chlorine or bromine, and
K is a radical of the formula

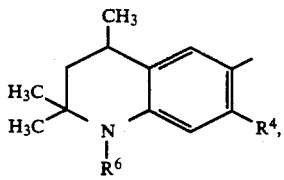

(IIc)

where
$R^4$ is hydrogen, methyl, methoxy, $C_1$-$C_4$-alkylsulfonylamino, $C_1$-$C_4$-monoalkylaminosulfonylamino, $C_1$-$C_4$-dialkylaminosulfonylamino, -$NHCOR^8$ or -$NHCO_2R^8$, where $R^8$ is phenyl, benzyl, tolyl or $C_1$-$C_8$-alkyl which may be interrupted by one or two oxygen atoms in ether function, $R^6$ is hydrogen, $C_1$-$C_8$-alkyl which may be substituted and which may be interrupted by one or two oxygen atoms in ether function, or $C_5$-$C_7$-cycloalkyl.

2. A quinolinemethine dye as claimed in claim 1, wherein
$R^1$ is chlorime,
$R^2$ is hydrogen or methyl, and
$R^3$ is hydrogen.